Figure 1:
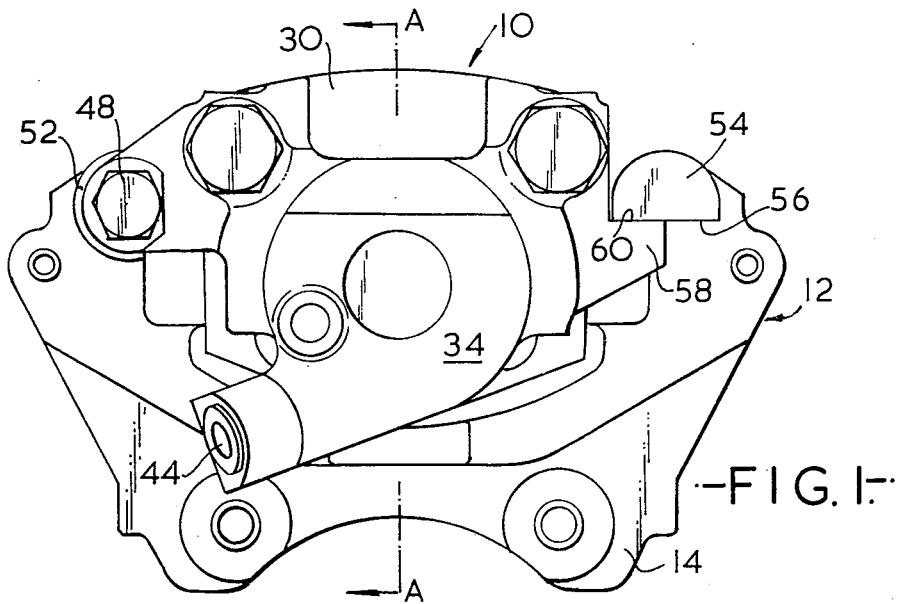

United States Patent [19]

Klassen

[11] 4,046,233
[45] Sept. 6, 1977

[54] SLIDING CALIPER DISC BRAKE

[75] Inventor: Horst Willi Klassen, St. Sebastian, Germany

[73] Assignee: Girling Limited, Birmingham, England

[21] Appl. No.: 652,737

[22] Filed: Jan. 27, 1976

[30] Foreign Application Priority Data

Feb. 1, 1975 United Kingdom .............. 4444/75

[51] Int. Cl.² ............................................. F16D 65/02
[52] U.S. Cl. .................................................... 188/73.3
[58] Field of Search ................. 188/71.1, 72.1, 73.3, 188/73.6

[56] References Cited

U.S. PATENT DOCUMENTS

| 3,580,361 | 5/1971 | Eggstein | 188/73.6 |
| 3,893,546 | 7/1975 | Kestermeier et al. | 188/73.3 |
| 3,942,611 | 3/1976 | Burnett | 188/73.3 |

Primary Examiner—Duane A. Reger
Attorney, Agent, or Firm—Scrivener, Parker, Scrivener and Clarke

[57] ABSTRACT

A sliding caliper disc brake has a caliper member slidably mounted on a fixed torque-taking member and carrying an actuator which urges a friction pad onto one side of a rotating disc whereupon the caliper member slides on the torque member and applies an opposite pad to the other side of the disc. Both pads are carried by the torque member so that circumferential drag forces experienced by the pads when they are clamped against the rotating disc are transferred directly to the torque member. The sliding connection is provided by a pin secured to one of the members and slidable in a bore in the other of the members. Outward pivoting of the caliper about the axis of the pin is restrained by a pair of preferably flat complementary sliding surfaces which permit sliding in the brake-applying direction of caliper movement and also sliding in directions towards and away from the pin, when the torque member flexes under drag loading, so as to shear such corrosion as may accumulate on the complementary sliding surfaces.

6 Claims, 6 Drawing Figures

U.S. Patent  Sept. 6, 1977  Sheet 2 of 2  4,046,233
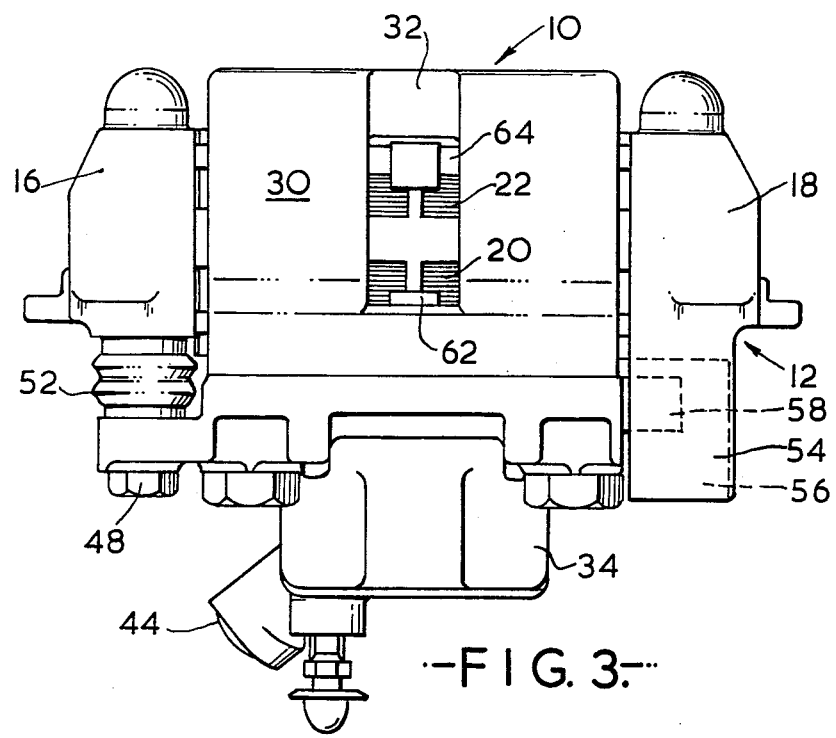
-FIG. 3.-
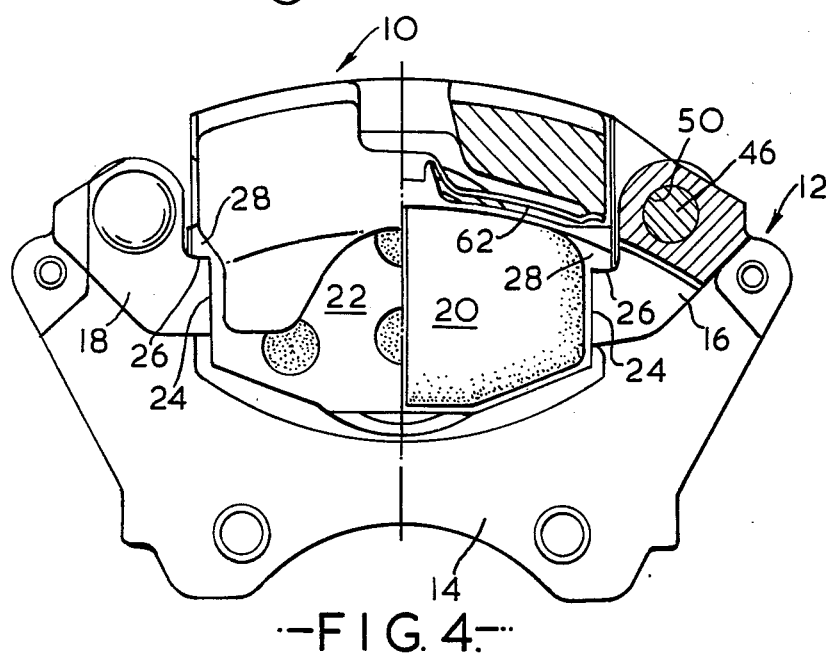
-FIG. 4.-

SLIDING CALIPER DISC BRAKE

The present invention relates to sliding caliper disc brakes of the type in which a caliper member, which is slidably mounted on a torque member and straddles a minor portion of the periphery of a rotatable disc, includes an actuator for directly urging a friction pad onto one side of the disc whereupon the caliper slides relative to the torque member and applies by reaction an opposite pad to the other side of the disc.

When the sliding connection between the two members is provided by a pair of pins fixed with respect to one of the members and slidable in openings in the other of the members, increased resistance to sliding arising from corrosion and dirt may be avoided by sealing the sliding surfaces of the pins and their openings. However, it is important to ensure that the pins and openings are accurately aligned and parallel. Any appreciable deviation, which will typically be in the order of inaccuracies expected in mass-production manufacture, will affect the ease with which the caliper member will slide on the torque member resulting in uneven braking when, for example, two nominally identical brakes with different sliding characteristics are mounted at the front wheels of a vehicle. Many proposals have been made to overcome this problem including the provision of resilient members which accommodate such misalignment as may be present and the provision of multicomponent pins which are adjustable during brake assembly. The latter solution has been found to be most satisfactory but problems can arise during heavy braking from deflection of the torque member resulting in intermittent misalignment between the pins and openings and consequential high resistance to sliding.

According to the present invention, there is provided a sliding caliper disc brake comprising a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc, the torque member having portions adapted to receive directly from both pads circumferential drag forces experienced by the pads on brake actuation, and the caliper member being slidably mounted on the torque member by a sliding connection which permits sliding of the caliper member only in a direction parallel to the axis of disc rotation and pivoting of the caliper with respect to the torque member, the brake including means for restraining said pivoting, said means including complementary sliding surfaces on the caliper member and torque member permitting sliding of the caliper member with respect to the torque member in a direction parallel to the axis of disc rotation and in directions towards and away from said sliding connection.

The complementary sliding surfaces are preferably substantially planar surfaces lying on or adjacent to a plane passing through the axis of caliper pivoting and are preferably resiliently biased into sliding engagement. Although the substantially planar sliding surfaces cannot conveniently be sealed against dirt and corrosion, said sliding connection so connects the caliper member to the torque member that the caliper is constrained to move with a deflected region of the torque member during heavy braking so that the substantially planar sliding surfaces will move laterally and tend to shear such corrosion and dirt as may have accumulated.

The substantially planar sliding surface of the caliper preferably faces in an outward direction, that is, in a direction from the inner to the outer ends of front and rear limb portions of the caliper. There may be an additional pair of sliding surfaces for limiting pivoting in an inward direction. These additional sliding surfaces may also be substantially planar surfaces. One of said limb portions may carry the actuator which is preferably a hydraulic actuator.

Said sliding connection is conveniently a pin which may be fastened, preferably releasably fastened, to the caliper and have an exposed arcuate, preferably cylindrical, sliding surface for sliding engagement in an opening in the torque member. Releasable fastening of the pin to the caliper is conveniently by a separate fastener such as a screw-threaded fastener which extends through an opening in the caliper and engages the pin so as to clamp the pin against the caliper. As an alternative, the pin may be slidably received in an opening in the caliper and be fastened, preferably releasably fastened, to the torque member. The pin may with advantage be provided with sealing means such as at least one resilient sealing boot which protects the sliding surface of the pin and which advantageously also retains the pin in its opening when the pin is released for removal of the caliper from the torque member. Only one such sealing means is necessary when the opening is a blind opening. The pin may extend across the space between the two limb portions of the caliper or may be confined to one of the limb portions, that is, to one side of the disc.

The pair of substantially planar sliding surfaces or one of the two pairs are preferably urged together into sliding engagement by a resilient element which may be interposed between the caliper member and the torque member or a structure or structures, such as the friction pads, carried by the torque member. The resilient element may therefore also serve to retain the friction pads in position in the torque member and prevent pad rattle. When there are two pairs of substantial planar sliding surfaces one sliding surface of one or each pair of cooperating sliding surfaces may be provided by a resilient element such as a leaf spring, preferably of wavy configuration.

Figure 2:
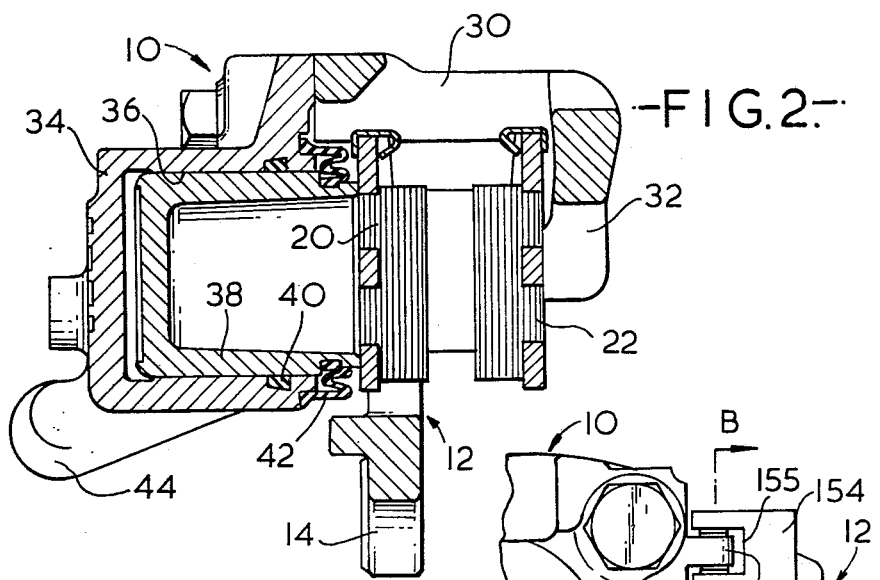
Figure 5:
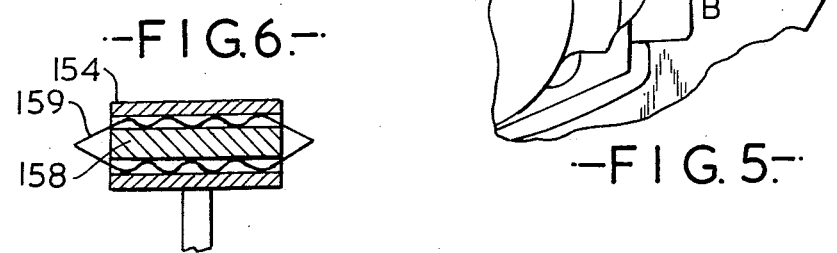
Figure 6:
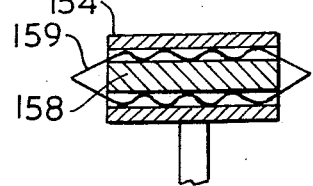

The invention is further described by way of example, with reference to the accompanying drawings, in which:

FIG. 1 is a rear elevation of a disc brake constructed in accordance with the invention, the rotatable disc being omitted, FIG. 2 is a section on the line A—A in FIG. 1, FIG. 3 is a top plan view of the disc brake, FIG. 4 is a front elevation of the disc brake, shown partly in section, FIG. 5 is a rear elevation of a part of a modified disc brake, and FIG. 6 is a section on the line B—B in FIG. 5.

The disc brake shown in FIGS. 1 to 4 comprises a caliper member generally designated 10 slidably mounted on a torque member generally designated 12 so as to straddle a minor portion of the periphery of a rotatable disc (not shown). The torque member 12 has a radially inwardly (of the disc) extending portion 14 by which the torque member 12 may be fixed to a vehicle. Alternatively, the torque member may be an integral part of the vehicle component such as a suspension strut. A pair of torque member arms 16 and 18 extend over the disc and provide location for friction pads 20 and 22. For this purpose, each of the arms 16 and 18 is formed with a surface 24 which slidably engages the respective side edge of the back plates of the two pads 20 and 22, and is also formed with a shoulder 26 upon which seat ears 28 extending from the pad back plates.

The caliper member 10 is a generally U-shaped member comprising an outer crown portion 30, a front inwardly extending limb portion 32 and a rear inwardly extending limb portion 34 which is formed with a cylinder 36 in which a piston 38 is slidable. The cylinder 36 carries a hydraulic seal 40. A resilient sealing boot 42 extends between the outer end of the piston 38 and the rear caliper limb. A feed port 44 for hydraulic fluid communicates with the interior of the cylinder 36. The piston 38 engages the back plate of the friction pad 20 and the front limb 32 of the caliper engages the other friction pad 22.

When hydraulic fluid under pressure is admitted into the cylinder 36 by way of the feed port 44, the piston 38 is displaced outwardly and applies the pad 20, which is accordingly known as the directly actuated pad, against the adjacent side of the rotatable disc (not shown). The caliper is thereby caused to slide rearwardly with respect to the torque member 12 to apply the other pad 22, the indirectly actuated pad, to the other side of the disc.

The sliding connection between the caliper member 10 and torque member 12 is provided by a pin 46 (FIG. 4) which is releasably connected to the caliper member 10 by a set screw 48 passing through an opening in the caliper member and screw threadedly engaging in an opening in the pin 46 to clamp the pin against the caliper. The pin 46 has a cylindrical sliding surface in sliding engagement with the wall of a cylindrical blind opening 50 in the torque member arm 16. A resilient sealing boot 52 protects the sliding surface of the pin 46 from the ingress of dirt and moisture and also serves to retain the pin 46 in the opening 50 when the set screw 48 is released for removal of the caliper member 10 from the torque member 12.

The other arm 18 of the torque member is formed with an extension 54 having a substantially planar surface 56 facing inwardly. A lug 58 extending laterally from the caliper also has a substantially planar surface 60 which faces outwardly so as to cooperate with the surface 56 to limit pivoting of the caliper member on the torque member in an outward direction about the axis of the pin 46. The two surfaces 56 and 60 are held in sliding abutment by a pair of leaf springs 62 and 64 interposed between the crown portion 30 of the caliper and the back plates of the pads 20 and 22. The leaf springs 62 and 64 also act therefore to urge the pads 20 and 22 inwardly into their proper positions between the torque member arms 16 and 18.

In the modification shown in FIGS. 5 and 6, the extension 54 of FIG. 1 is replaced by an extension 154 which is formed with a parallel-sided slot 155 into which a caliper lug 158 extends with clearance. The clearance between the lug 158 and extension 154 is occupied by a resilient element which is shown in FIG. 6 to be a continuous wavy spring 159. The spring 159 provides the sliding suffaces which cooperate with the parallel sides of the slot 155 and the caliper lug 158 to define therewith two pairs of complementary sliding surfaces, the shape of the spring 159 providing virtual line contact between the spring and torque member arm so that there is little chance of seizure resulting from corrosion. The embodiment of FIGS. 5 and 6 may also have pad-retaining leaf springs such as the springs 62 and 64 even though the wavy spring 159 serves to locate the caliper lug 158 with respect to the torque plate arm extension 154.

I claim:

1. A sliding caliper disc brake comprising a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc, the torque member having portions adapted to receive directly from both pads all circumferential drag forces experienced by the pads on brake actuation, connecting means between the caliper member and the torque member constructed and arranged to permit sliding of the caliper member only in a direction parallel to the axis of disc rotation and also pivoting of the caliper with respect to the torque member, means for restraining said pivoting comprising complementary sliding surfaces on the caliper member and torque member permitting relative sliding between the caliper member and the torque member in a direction parallel to the axis of disc rotation and in a direction perpendicular to said direction so as to accommodate deformation of the torque member during braking without transfer of drag forces to said connecting means, said complementary sliding surfaces being arranged to limit said pivoting of the caliper member in a direction radially outwardly of the disc, and means for resiliently biasing the complementary sliding surface on the caliper outwardly into direct sliding engagement with the complementary surface on the torque member.

2. A sliding caliper disc brake as claimed in claim 1 in which said complementary sliding surfaces are substantially planar surfaces.

3. A sliding caliper disc brake as claimed in claim 2 in which the substantially planar surfaces lie on or parallel to a plane passing through the axis of caliper pivoting.

4. A sliding caliper disc brake as claimed in claim 1 including second complementary sliding surfaces arranged to limit inward pivoting of the caliper member.

5. A sliding caliper disc brake as claimed in claim 1 wherein said connecting means comprises single pin means slidably and pivotally cooperating with aligned openings in said caliper and torque members.

6. A sliding caliper disc brake as claimed in claim 5 wherein said complementary surfaces are defined by an extension on the torque member having an inwardly facing substantially planar surface and by a lug extending laterally from the caliper member and having an outwardly facing substantially planar surface cooperating with the first mentioned planar surface to limit pivoting of the caliper member in an outward direction about said pin means.

* * * * *